United States Patent [19]
Chatwell

[11] Patent Number: 5,929,751
[45] Date of Patent: Jul. 27, 1999

[54] REAR MOUNTED VEHICULAR HORN

[76] Inventor: Christine Chatwell, 438 Mountain Laurel Ct., Mountain View, Calif. 94043

[21] Appl. No.: 08/944,695

[22] Filed: Oct. 6, 1997

[51] Int. Cl.[6] ....................................................... G08B 3/00
[52] U.S. Cl. .................................... 340/384.1; 340/388.1; 340/391.1; 340/474; 116/142 R; 181/141; 181/150
[58] Field of Search ............................... 340/384.1, 388.1, 340/396.1, 391.1, 474; 381/86; 181/141, 150; 116/137 R, 142 R

[56] References Cited

U.S. PATENT DOCUMENTS 3,818,438  6/1974  Stacha, Jr. ................................ 340/474
4,442,512  4/1984  Kodera et al. ........................... 181/400
5,397,866  3/1995  Lyons et al. ............................. 181/152

*Primary Examiner*—Donnie L. Crosland

[57] ABSTRACT

A rear mounted vehicular horn is provided including a vehicle with a front extent and a rear extent. A horn is situated at the rear extent and directed rearwardly from the vehicle. The horn has a speaker for emitting a high intensity tone upon the actuation thereof. Next provided is a pair of horn switches situated within a steering wheel of the vehicle and connected to the horn. The horn switch functions to actuate the speaker of the horn upon the depression thereof thereby emitting the high intensity tone from the rear extent of the vehicle.

1 Claim, 2 Drawing Sheets

REAR MOUNTED VEHICULAR HORN

BACKGROUND OF THE INVENTION

1. Field of the Invention

The present invention relates to a rear mounted vehicular horn and more particularly pertains to alerting a following driver to prevent rear end collisions and to prevent accidents from occurring while a driver is backing up.

2. Description of the Prior Art

The use of vehicle horns is known in the prior art. More specifically, vehicle horns heretofore devised and utilized for the purpose of alerting adjacent drivers are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,078,074; U.S. Pat. No. 5,022,341; U.S. Pat. No. Des. 245,405; U.S. Pat. No. 5,420,563; and U.S. Pat. No. 3,886,546.

In this respect, the rear mounted vehicular horn according to the present invention substantially departs from the conventional concepts and designs of the prior art, and in so doing provides an apparatus primarily developed for the purpose of alerting a following driver to prevent rear end collisions and to prevent accidents from occurring while a driver is backing up.

Therefore, it can be appreciated that there exists a continuing need for a new and improved rear mounted vehicular horn which can be used for alerting a following driver to prevent rear end collisions and to prevent accidents from occurring while a driver is backing up. In this regard, the present invention substantially fulfills this need.

SUMMARY OF THE INVENTION

In view of the foregoing disadvantages inherent in the known types of vehicle horns now present in the prior art, the present invention provides an improved rear mounted vehicular horn. As such, the general purpose of the present invention, which will be described subsequently in greater detail, is to provide a new and improved rear mounted vehicular horn which has all the advantages of the prior art and none of the disadvantages.

To attain this, the present invention essentially comprises a vehicle having a front bumper and a rear bumper each with a recess formed therein at a central extent thereof. Note FIG. 1. Next provided is a pair of horns. As shown in FIG. 3, each horn is equipped with a disk-shaped inboard portion having a pair of circular faces and a periphery formed therebetween for defining an interior space. At least one mounting tab with an aperture formed therein is integrally coupled to the periphery of inboard portion and extends upwardly therefrom in coplanar relationship with one of the circular faces. An outboard portion of each horn has a frusto-conical configuration and is integrally coupled to the periphery of the inboard portion. Each horn has speaker means situated within the inboard portion thereof for emitting a high intensity tone upon the actuation thereof. The horns include a front horn mounted via the mounting tab thereof within the recess of the front bumper. Associated therewith is a rear horn mounted via the mounting tab thereof within the recess of the rear bumper. It should be noted that the outboard portions of the horns are in coaxial alignment. With reference now to FIG. 4, it is shown that a pair of horn switches is connected to the front and rear horn. Such switches are situated within a steering wheel of the vehicle, as is conventional. The horn switches are adapted to actuate the speaker means of both the front horn and the rear horn upon the depression thereof. As such, the horns are adapted for emitting the high intensity tone from a rear and front extent of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rear mounted vehicular horn which has all the advantages of the prior art vehicle horns and none of the disadvantages.

It is another object of the present invention to provide a new and improved rear mounted vehicular horn which may be easily and efficiently manufactured and marketed.

It is a further object of the present invention to provide a new and improved rear mounted vehicular horn which is of a durable and reliable construction.

An even further object of the present invention is to provide a new and improved rear mounted vehicular horn which is susceptible of a low cost of manufacture with regard to both materials and labor, and which accordingly is then susceptible of low prices of sale to the consuming public, thereby making such rear mounted vehicular horn economically available to the buying public.

Still yet another object of the present invention is to provide a new and improved rear mounted vehicular horn which provides in the apparatuses and methods of the prior art some of the advantages thereof, while simultaneously overcoming some of the disadvantages normally associated therewith.

Still another object of the present invention is to alert a following driver to prevent rear end collisions and to prevent accidents from occurring while a driver is backing up.

Lastly, it is an object of the present invention to provide a new and improved rear mounted vehicular horn including a vehicle with a front extent and a rear extent. A horn is situated at the rear extent and directed rearwardly from the vehicle. The horn has a speaker for emitting a high intensity tone upon the actuation thereof. Next provided is a horn switch situated within a steering wheel of the vehicle and connected to the horn. The horn switch functions to actuate the speaker of the horn upon the depression thereof thereby emitting the high intensity tone from the rear extent of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
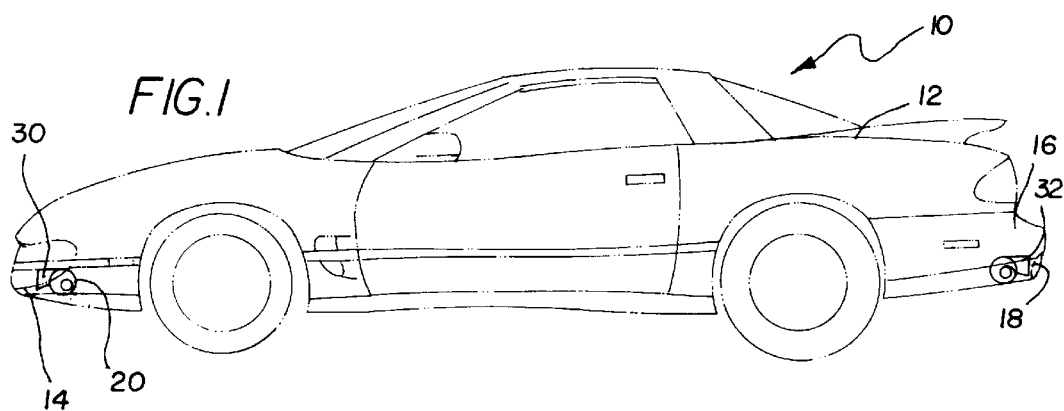
FIG. 1 is a perspective illustration of the preferred embodiment of the rear mounted vehicular horn constructed in accordance with the principles of the present invention.
Figure 2:
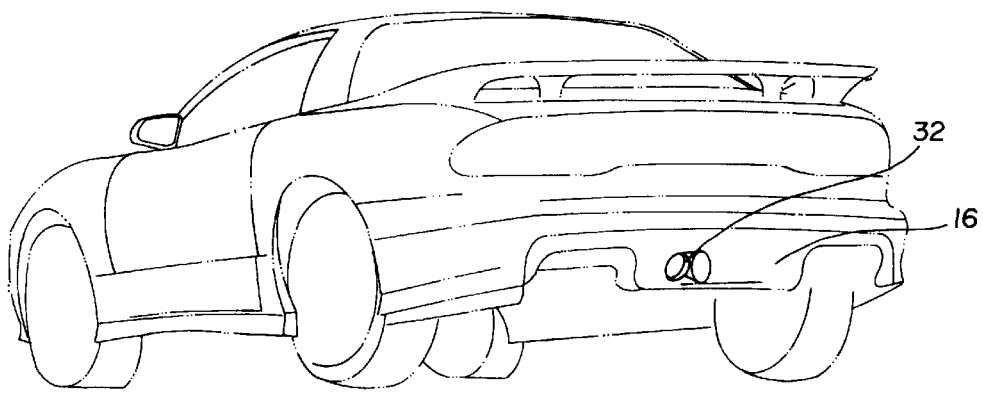
FIG. 2 is a rear view of the present invention.

With reference now to the drawings, and in particular to FIG. 1 thereof, a new and improved rear mounted vehicular horn embodying the principles and concepts of the present invention and generally designated by the reference numeral 10 will be described.

The present invention, the new and improved rear mounted vehicular horn, is comprised of a plurality of components. Such components in their broadest context include a front and rear horn. Such components are individually configured and correlated with respect to each other so as to attain the desired objective.

More specifically, it will be noted that the system 10 of the present invention includes a vehicle 12 having a front bumper 14 and a rear bumper 16 each with a recess 18 formed therein at a central extent thereof. Note FIG. 1.

Figure 3:
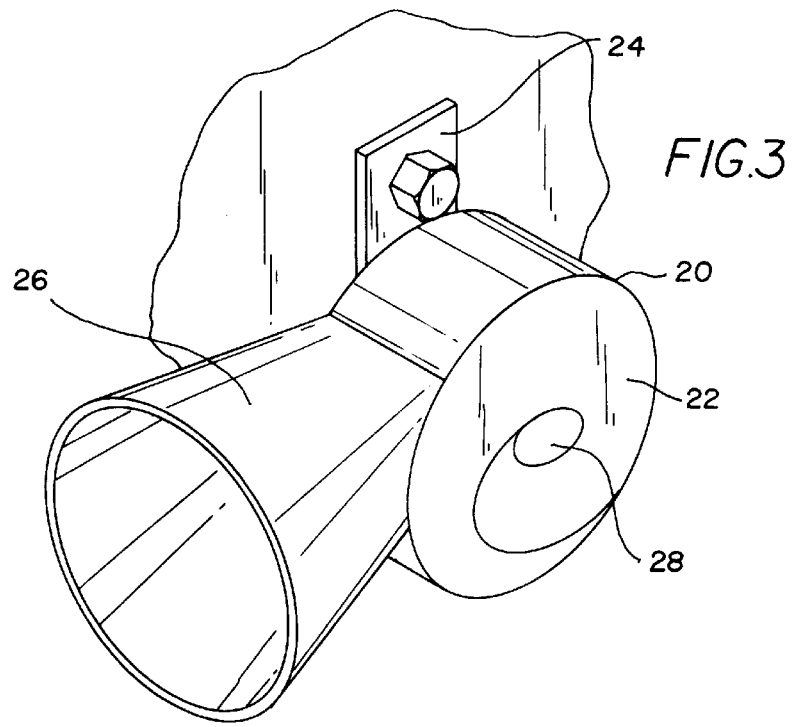
FIG. 3 is a close up view of one of the horns of the present invention.

Next provided is a pair of horns 20. As shown in FIG. 3, each horn is equipped with a disk-shaped inboard portion 22 having a pair of circular faces and a periphery formed therebetween for defining an interior space. At least one mounting tab 24 with an aperture formed therein is integrally coupled to the periphery of inboard portion and extends upwardly therefrom in coplanar relationship with one of the circular faces. An outboard portion 26 of each horn has a frusto-conical configuration and is integrally coupled to the periphery of the inboard portion. Each horn has speaker means 28 situated within the inboard portion thereof for emitting a high intensity tone upon the actuation thereof. It should be noted that each speaker means is conventional in the art as exemplified by U.S. Pat. No. 5,022,341 which is incorporated herein by reference.

The horns include a front horn 30 mounted via the mounting tab thereof within the recess of the front bumper. Associated therewith is a rear horn 32 mounted via the mounting tab thereof within the recess of the rear bumper. The mounting tabs are preferably coupled to an inner side face of the associated recess via a bolt. When installed, an outboard end of the outboard portion of each horn is flush with an opening of the associated recess. It should be further noted that the outboard portions of the horns are in coaxial alignment. In the alternative, the horns may be situated discreetly within the body of the vehicle. In any case, the rear auto horn could be obtained either by purchasing it off the shelf and installing it on a driver's existing auto, or by purchasing a new auto in which the rear auto horn is one of the manufacturer's options.

Figure 4:
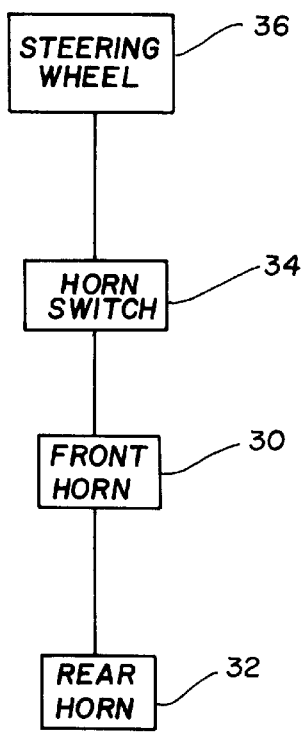
FIG. 4 is a schematic diagram depicting the interconnection of various components of the present invention.

With reference now to FIG. 4, it is shown that a pair of horn switches 34 is connected to the front and rear horn. Such switches are situated within a steering wheel 36 of the vehicle, as is conventional. The horn switches are adapted to actuate the speaker means of the corresponding horn upon the depression thereof. As such, the horns are adapted for emitting the high intensity tone independently from a rear and front extent of the vehicle. In an alternative embodiment, a single horn switch may be employed which is connected to both horns for effecting the simultaneous actuation thereof. It should be understood that the emission of the loud tone from the rear extent of the vehicle is critical for alerting a driver behind the user and further to prevent accidents from occurring while a driver is backing up. By being able to alert the following driver, many rear end collisions are avoided.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved rear mounted vehicular horn comprising, in combination:

a vehicle having a front bumper and a rear bumper each with a recess formed therein at a central extent thereof;

a pair of horns each with a disk-shaped inboard portion with a pair of circular faces and a periphery formed therebetween for defining an interior space, at least one mounting tab with an aperture formed therein with the tab being integrally coupled to the periphery of inboard portion and extending upwardly therefrom in coplanar relationship with one of the circular faces, and an outboard portion having a frusto-conical configuration and integrally coupled to the periphery of the inboard portion, each horn having speaker means situated within the inboard portion thereof for emitting a high intensity tone upon the actuation thereof;

said horns including a front horn mounted via the mounting tab thereof within the recess of the front bumper and a rear horn mounted via the mounting tab thereof within the recess of the rear bumper, wherein the outboard portions of the horns are in coaxial alignment, wherein the outboard portions extend outwardly with respect to the recesses;

a pair of horn switches situated within a steering wheel of the vehicle and connected to the front and rear horn, the horn switches adapted to actuate the speaker means of an associated one of the horns upon the depression thereof thereby allowing the selective emission the high intensity tone from a rear and front extent of the vehicle.

* * * * *